US006797084B2

(12) United States Patent
Shuster et al.

(10) Patent No.: US 6,797,084 B2
(45) Date of Patent: Sep. 28, 2004

(54) METHOD OF MANUFACTURING CASE HARDENED JOURNAL CROSS FOR USE IN A UNIVERSAL JOINT

(75) Inventors: Mark Shuster, Houston, TX (US); Donald A. Rhoda, Perrysburg, OH (US); Glen Fillion, Tokyo (JP); Otto Zaslavskiy, Brooklyn, NY (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/176,392

(22) Filed: Jun. 20, 2002

(65) Prior Publication Data

US 2003/0104870 A1 Jun. 5, 2003

(Under 37 CFR 1.47)

Related U.S. Application Data

(60) Provisional application No. 60/300,403, filed on Jun. 22, 2001.

(51) Int. Cl.[7] .............................. C21D 9/04; C21D 1/42
(52) U.S. Cl. ........................ 148/567; 148/569; 148/639
(58) Field of Search ................................ 148/639, 567, 148/569; 464/14, 136, 17, 178

(56) References Cited

U.S. PATENT DOCUMENTS

| | | | |
|---|---|---|---|
| 3,655,466 A | * | 4/1972 | Ostrovsky et al. ........... 148/145 |
| 3,684,854 A | | 8/1972 | Nikonov et al. |
| 3,696,225 A | | 10/1972 | Kalner et al. |
| 4,371,358 A | | 2/1983 | Laue |
| 4,415,378 A | | 11/1983 | McKinney et al. |
| 4,795,200 A | * | 1/1989 | Tung ........................... 285/334 |
| 5,853,502 A | | 12/1998 | Aihara et al. |
| 6,224,489 B1 | * | 5/2001 | Gille et al. .................. 464/136 |

FOREIGN PATENT DOCUMENTS

| | | |
|---|---|---|
| DE | 4339204 | 11/1993 |
| GB | 1233960 | 3/1971 |
| JP | 020034718 | 2/1990 |
| WO | WO 01/34851 | 5/2001 |

OTHER PUBLICATIONS

"New Induction Hardening Technology," Advanced Materials & Processes, pp. 225–227, Oct. 1998.

* cited by examiner

Primary Examiner—Deborah Yee
(74) Attorney, Agent, or Firm—MacMillan, Sobanski & Todd, LLC

(57) ABSTRACT

An apparatus for manufacturing a case hardened journal cross includes an inductor having an open side to allow the journal cross to be inserted and withdrawn from the induction process with relative ease. The conductive frame of the inductor is shaped in a cross-like pattern that outlines the outer perimeter of a journal cross on each side of the journal cross. Because the induction coil passes across both sides of the journal cross, heat treating may be enhanced at specific locations of the outer surface of the journal cross by adjusting the distance of the induction coil from the journal cross. Also, a method for manufacturing such a journal cross includes determining the maximum stress distribution for the journal cross and, based thereon, determining the desired depth and location of the case hardening. The depth of the case hardening throughout each of the trunnions is calculated based upon the stress distribution as being greater than or equal to one-fourth of the outer diameter of the trunnion less the inner diameter of the lubrication passageway formed through the trunnion. A heat treatment is performed using the apparatus described above to achieve the desired case hardened layer throughout the trunnion.

41 Claims, 4 Drawing Sheets

METHOD OF MANUFACTURING CASE HARDENED JOURNAL CROSS FOR USE IN A UNIVERSAL JOINT

CROSS REFERENCE TO RELATED APPLICATIONS

This application claims the benefit of U.S. Provisional Application No. 60/300,403, filed Jun. 22, 2001, the disclosure of which is incorporated herein by reference.

BACKGROUND OF THE INVENTION

This invention relates in general to the manufacture of journal crosses for use in universal joints. In particular, this invention relates to an improved structure for a case hardened journal cross for use in a universal joint and to a method of manufacturing same.

In most land vehicles in use today, a drive train assembly is provided for transmitting rotational power from an output shaft of an engine/transmission assembly to an input shaft of an axle assembly so as to rotatably drive the wheels of the vehicle. To accomplish this, a typical vehicular drive train assembly includes a hollow cylindrical driveshaft tube having first and second ends. A first universal joint is connected between the output shaft of the engine/transmission assembly and the first end of the driveshaft tube, while a second universal joint is connected between the second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

Each of the universal joints usually includes a first yoke, a second yoke, and a journal cross connected therebetween. A typical journal cross includes a central body portion having four cylindrical trunnions extending outwardly therefrom. The trunnions are oriented in a single plane and extend at right angles relative to one another. A hollow cylindrical bearing cup is mounted on the end of each of the trunnions. Needle bearings or similar friction reducing structures are usually provided between the outer cylindrical surfaces of the trunnions and the inner cylindrical surfaces of the bearing cups to facilitate rotational movement of the bearing cups relative to the trunnions. The bearing cups that are mounted on a first opposed pair of the trunnions of the journal cross are connected to the first yoke, while the bearing cups that are mounted on a second opposed pair of the trunnions are connected to the second yoke.

The journal crosses of the universal joints subjected to two major types of forces during operation of the drive train assembly. First, when torque is transmitted through the universal joint, relatively large bending forces are applied generally throughout each of the trunnions. Such relatively large bending forces tend to flex the trunnions laterally from the right angular orientation described above. To accommodate these relatively large bending forces, it is desirable that the central body portion and the trunnions of the journal cross be formed from a material that is sufficiently strong to absorb the bending loads, yet soft enough to allow some flexing of the trunnions relative to the central body portion to avoid undesirable brittleness. Second, because the various shafts of the drive train assembly are usually axially misaligned during rotation as described above, the bearing cups are constantly rotated in a reciprocating manner relative to the associated trunnions. Because of the rolling engagement of the needle bearings resulting from such constant rotation, relatively small and continuous contact forces are applied locally to the outer cylindrical surfaces of the trunnions. To accommodate these relatively small contact forces, it is desirable that the outer surfaces of the trunnions be formed from a relatively hard material that is resistant to undesirable wear.

To address these competing considerations, it has been found desirable to form the journal cross of a universal joint from a material having a relatively soft interior portion (to permit desirable limited flexing of the trunnions) and a relatively hard exterior portion on the outer surfaces of the trunnions (to prevent undesirable wear from the needle bearings). Such a structure can be referred to as a case hardened journal cross, wherein the journal cross has a relatively thin outer layer (referred to as the case) that is significantly harder than the remaining inner regions thereof (referred to as the core). Thus, case hardened journal crosses have a hardened case that generally follows the contour of the central body portion and trunnions, rather than penetrating deeply therein to the core thereof.

One known method for manufacturing a case hardened journal cross is the process of carburization. To perform carburization, a journal cross is initially formed from a medium hardenability steel alloy, such as 8620 alloy steel. The journal cross is heated to a relatively high temperature in the presence of a carbon enriched atmosphere for a period of time, then subsequently cooled. The heating and cooling of the gear causes the entire journal cross (both the case and the core) to become hardened. The magnitude of the core hardening is dependent, among other things, upon the initial content of carbon in the steel, the temperature to which the journal cross is heated, and the rate of cooling. With respect to the case, however, the high temperature causes carbon from the atmosphere to be diffused into the surface of the journal cross. This carbon diffusion causes the case of the journal cross to become more hardened than the core of the gear when subsequently cooled. The depth of carbon penetration into the journal cross (and, therefore, the depth of the hardened case) is directly proportional to the magnitude of the temperature to which the journal cross is treated and the time duration of such treatment.

Although carburization has been used effectively to manufacture case hardened journal crosses for many years, it has been found to be somewhat inefficient in the context of modern production practices. Specifically, carburization is a process that requires a relatively large capital investment for performing the treatment process, including heating, handling, and cooling the parts. Also, carburization is a relatively slow process to perform, typically requiring five to ten hours to perform for each journal cross. Furthermore, carburization is a process that is best suited for simultaneous treatment of a relatively large quantity of identical parts, resulting in an undesirably large quantity of treated parts that must be stored in temporary inventory until they can be consumed. Thus, it would be desirable to provide an alternative method for manufacturing a case hardened journal cross for use in a universal joint.

SUMMARY OF THE INVENTION

This invention relates to an improved structure for a case hardened journal cross for use in a universal joint and to a method of manufacturing same. In particular, the current invention provides an apparatus and method to optimize the depth and location of the case hardened layer using an inductor that is shaped to facilitate the manufacturing process. The apparatus includes an inductor that is specifically designed with one open side to allow the journal cross to be inserted and withdrawn from the induction process with relative ease. The conductive frame of the inductor is shaped in a cross-like pattern that outlines the outer perimeter of a journal cross on each side of the journal cross. Because the induction coil passes across both sides of the journal cross, heat treating may be enhanced at specific locations of the outer is surface of the journal cross by adjusting the distance of the induction coil from the journal cross. This is particular effective at optimizing the case hardened layer at specific locations as determined by computer modeling or other techniques. The present invention discloses a method for manufacturing a journal cross for a universal joint with optimized location and depth of the case hardened layer. The method first involves the step of determining the maximum stress distribution for the journal cross, using computer modeling or other techniques, based on the intended application in which the journal cross is to be applied. Once the maximum stress distribution has been determined, the desired depth and location of the case hardening is determined. In particular, the depth of the case hardening throughout each of the trunnions is calculated based upon the stress distribution as being greater than or equal to one-fourth of the outer diameter of the trunnion less the inner diameter of the lubrication passageway formed through the trunnion. In the final step, the heat treatment is performed using the apparatus described above to achieve the desired case hardened layer throughout the trunnion for the particular application in which the universal joint is to be used.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
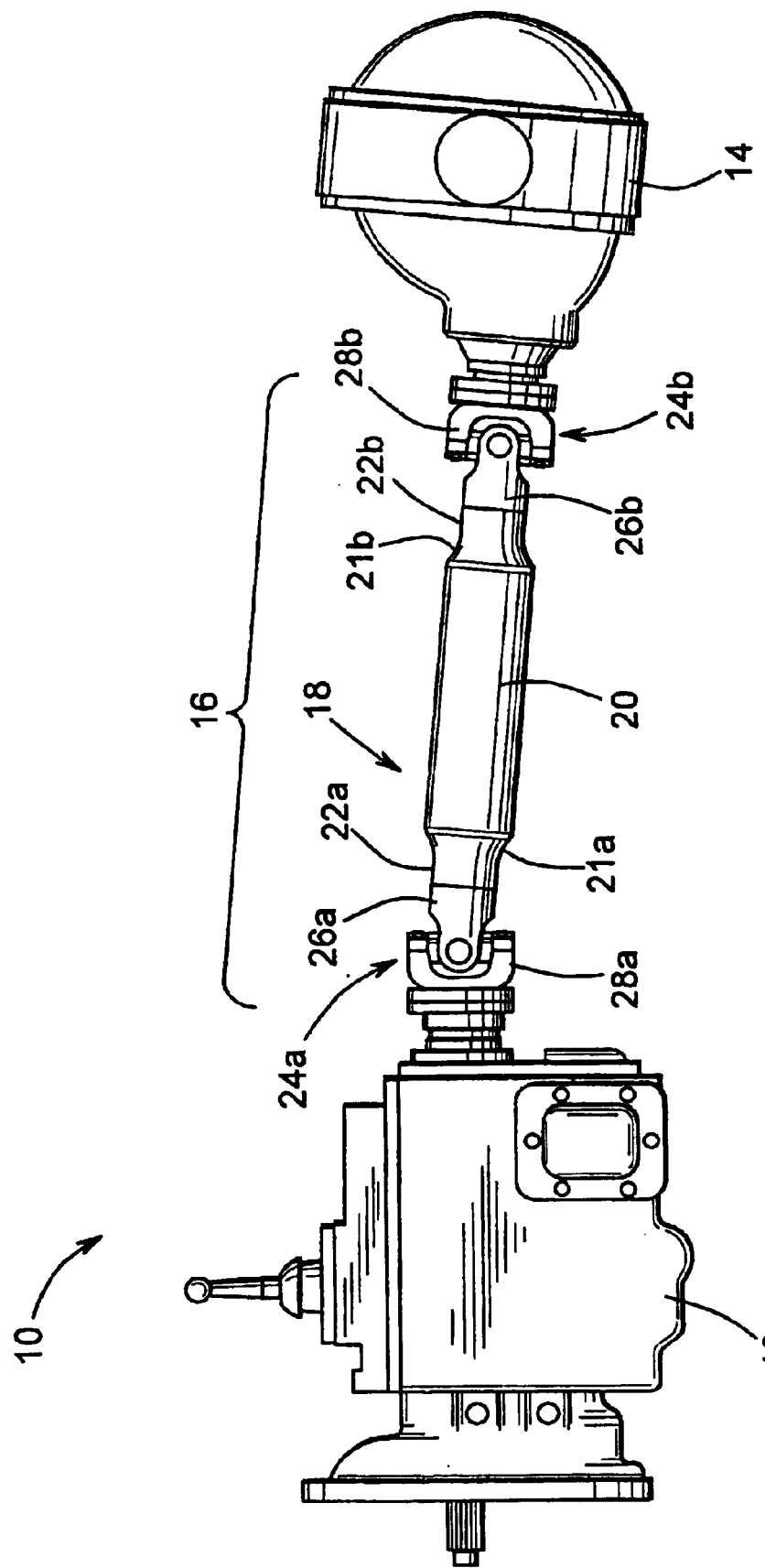
FIG. 1 is a side elevational view of a vehicle drive train assembly including a pair of universal joints having respective journal crosses that have been manufactured in accordance with this invention.

Referring now to the drawings, there is illustrated in FIG. 1 a vehicular drive train assembly, indicated generally at 10, that is generally conventional in the art. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a cylindrical driveshaft tube, indicated generally at 18, having a center portion 20 and a pair of opposed end portions 22a and 22b. In the illustrated embodiment, the center portion 20 of the driveshaft tube 18 is formed having a larger outer diameter than either of the end portions 22a and 22b. Thus, respective transition regions 21a and 21b are defined between the larger diameter center portion 20 of the illustrated driveshaft tube 18 and each of the smaller diameter end portions 22a and 22b thereof. However, the driveshaft tube 18 may be formed having a constant diameter throughout the length thereof or any other desired shape. Alternatively, the single driveshaft tube 18 may be replaced by a compound driveshaft assembly (not shown) having separate first and second driveshaft sections that are supported by a center bearing assembly between the transmission 12 and the axle assembly 14. The driveshaft tube 16 can be formed from any suitable material, such as a lightweight aluminum alloy (6061 alloy, for example).

The output shaft of the transmission 12 and the input shaft of the axle assembly 14 are typically not co-axially aligned. To accommodate this, a pair of universal joints, indicated generally at 24a and 24b, are provided at the end portions 22a and 22b of the driveshaft tube 18 to respectively connect the driveshaft tube 18 to the output shaft of the transmission 12 and to the input shaft of the axle assembly 14. The first universal joint 24a includes a first yoke, such as a tube yoke 26a, that is secured to the forward end portion 22a of the driveshaft tube 18 by any conventional means, such as by welding or adhesives. The first universal joint 24a further includes a second yoke, such as a half round end yoke 28a, that is connected to the output shaft of the transmission 12. Similarly, the second universal joint 24b includes a first yoke, such as a tube yoke 26b, that is secured to the rearward end portion 22b of the driveshaft tube 18 by any conventional means, such as by welding or adhesives. The second universal joint 24b further includes a second yoke, such as a half round end yoke 28b that is connected to the input shaft of the axle assembly 14.

Figure 2:
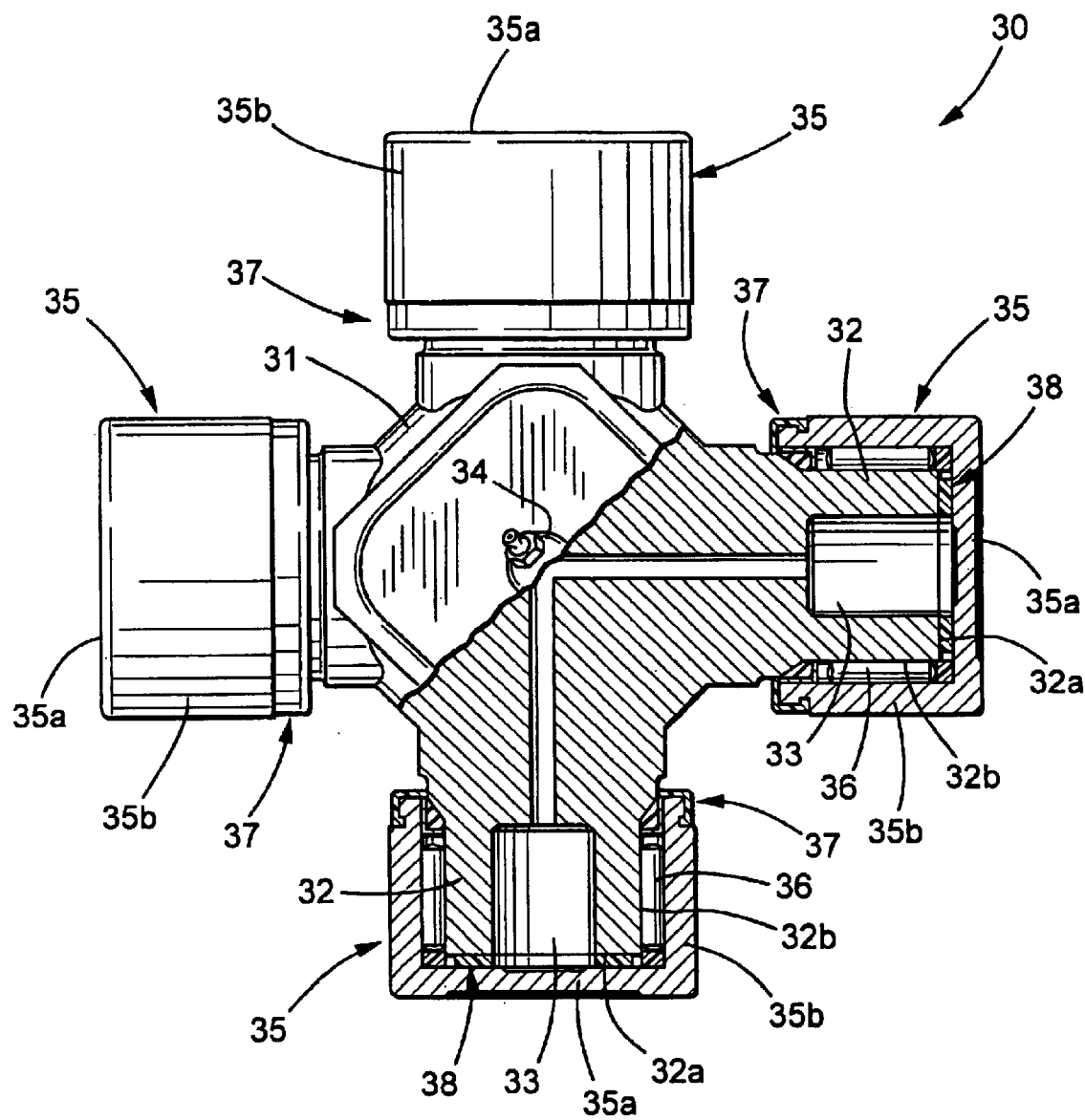
FIG. 2 is an enlarged elevational view, partially in cross section, of a first embodiment of a journal cross for use in one of the universal joints illustrated in FIG. 1.

FIG. 2 illustrates a first embodiment of a cross, indicated generally at 30, of one of the universal joints 24a and 24b illustrated in FIG. 1. The illustrated cross 30 includes a central body portion 31 having a plurality of trunnions 32 extending outwardly therefrom. In the illustrated embodiment, four of such trunnions 32 are formed integrally with the body portion 31. The trunnions 32 are disposed at right angles relative to one another and are oriented so as to lie in a single plane. Each of the illustrated trunnions 32 is generally cylindrical in shape, having an axially outermost end surface 32a and a cylindrical bearing surface 32b. However, the trunnions 32 may be formed having any desired shape or configuration and need not be formed integrally with the central body portion 31.

An internal passageway 33 is formed in each of the illustrated trunnions 32. Each of the internal passageways 33 extends outwardly from a central cavity formed in the central body portion 31 of the journal cross 30 through to the outer end surface 32b thereof. A fitting 34 may be provided in an aperture (not shown) formed in the central body portion 31 of the cross 30 to provide fluid communication with the central cavity thereof. The fitting 34 can be used to supply lubricant through the central cavity and into the passageways 33 of the trunnions 32 for a purpose that will be explained below. The trunnions 32 may be formed having no such internal passageways 13 if desired.

A bearing cup, indicated generally at 35, is disposed about the end portion of each of the trunnions 32. Each of the bearing cups 35 includes an outer end portion 35a having a hollow cylindrical skirt portion 35b extending therefrom. When installed on the trunnion 32, an inner surface of the outer end portion 35a of the bearing cup 35 is disposed adjacent to the outer end surface 32a of the trunnion 32, while the hollow cylindrical skirt portion 35b of the bearing cup 35 is disposed about the cylindrical bearing surface 32b of the trunnion 32. A plurality of needle bearings 36 or other bearing structure is disposed between the inner surface of the hollow cylindrical skirt portion 35b of the bearing cup 35 and the cylindrical bearing surface 32b of the trunnion 32. Also, a conventional seal and dust guard assembly, indicated generally at 37, may (if desired) be provided about the open end of each bearing cup 35. Lastly, a thrust washer, indicated generally at 38, may (if desired) be disposed between the outer end surface 32a of at least one (and preferably all) of the trunnions 32 and the associated inner surfaces of the end portions 35a of the bearing cups 35.

As mentioned above, the fitting 34 can be used to supply lubricant through the central cavity and into the passageways 33 of the trunnions 32. When so supplied, lubricant flows radially outwardly through each of the passageways 33, laterally between the outer end surfaces 32a of the trunnions 32 and the inner surfaces of the associated outer end portions 35a of the bearing cups 35, and radially inwardly into the regions of the needle bearings 36. As a result, lubricant can be supplied to the needle bearings 36 to facilitate rotational movement of the bearing cups 35 relative to the associated trunnions 32. Although the illustrated lubricant fitting 34 communicates with the central cavity of the central body portion 31 of the cross 30, the lubricant fitting 34 may be located at any desired location on the cross 30.

Figure 3:
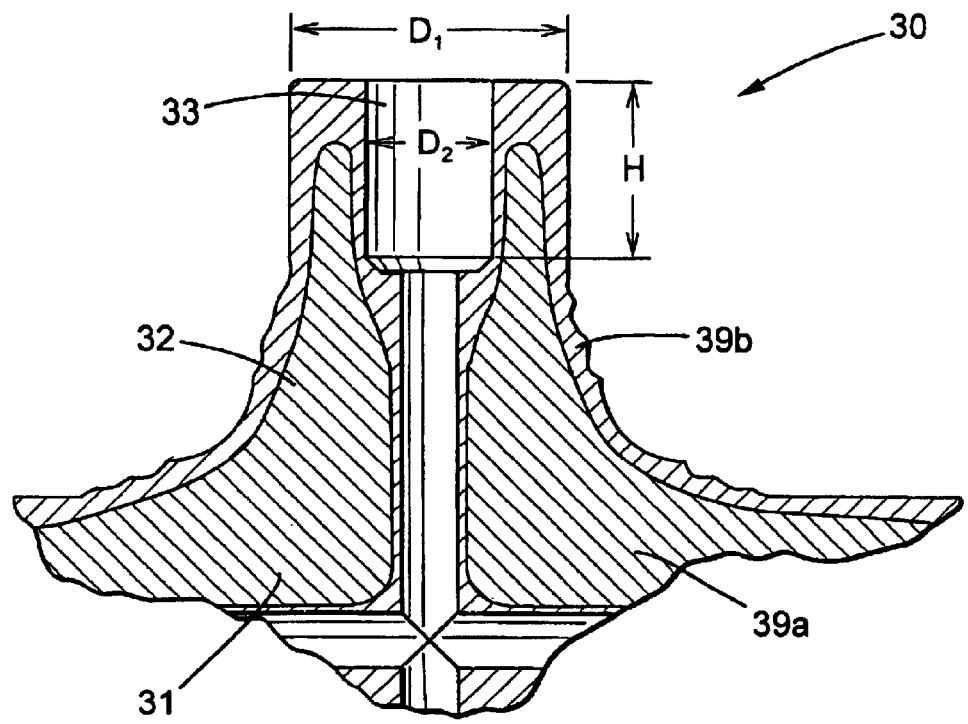
FIG. 3 is a further enlarged sectional elevational view of a portion of the first embodiment of a structure for the journal cross illustrated in FIG. 2.

FIG. 3 is an enlarged sectional elevational view of a portion of the first embodiment of a structure for the journal cross 30 illustrated in FIG. 2. As shown therein, the journal cross 30 has been subjected to a case hardening heat treatment process so as to have a relatively soft interior portion or core 39a and a relatively hard exterior portion or case 39b on the outer surfaces of each of the trunnions 32.

The method by which the journal cross 30 is formed to have this structure will be explained. Initially, the maximum stress distribution for the particular application for the journal cross 30 can be determined, such as by using known computer modeling or other conventional analytical methods. These stresses can, for example, be determined as the sum of the contact pressures applied to the journal cross 30 during use and the maximum principal stresses resulting from torque applied to the trunnions 32, such as described above.

Based upon this calculated stress distribution, the depth of the relatively hard case 39b throughout each of the trunnions 32 can be calculated. Preferably, the relatively hard case 39b proportionally follows the maximum stress distribution throughout the journal cross 30. Although any desired depth can be attained, it has been found desirable for the depth of the relatively hard case 39b to be greater than or equal to one-fourth of the outer diameter of the trunnion 32 less the inner diameter of the lubrication passageway 33 formed through the trunnion 32.

For example, as shown in FIG. 3, if the outer diameter defined by the trunnion 32 is designated as $D_1$ and the inner diameter defined by the lubricant passageway 33 is designated as $D_2$, then the depth of the relatively hard case 39b can be defined as follows:

$$\text{Case Depth} \geq (D_1 - D_2)/4$$

The length of the lubrication passageway 33 can be defined in relation to the axial length of the needle bearings 36. For example, the length H of the lubrication passageway 33 can be in the range of from about 0.5 to about 1.3 of the axial length of the needle bearings 36. In any event, the diameter of the lubricant passageway 33 (or each of the diameters, if the lubricant passageway 33 is formed having multiple diameter or stepped portions) can be selected to produce the desired depth and geometry for the relatively hard case 39b. In other words, the shape and diameter of the lubrication passageway 33 can be selected in accordance with this calculation to produce the desired case hardening depth throughout the trunnion 32 for the particular application for the journal cross 30.

Figure 4:
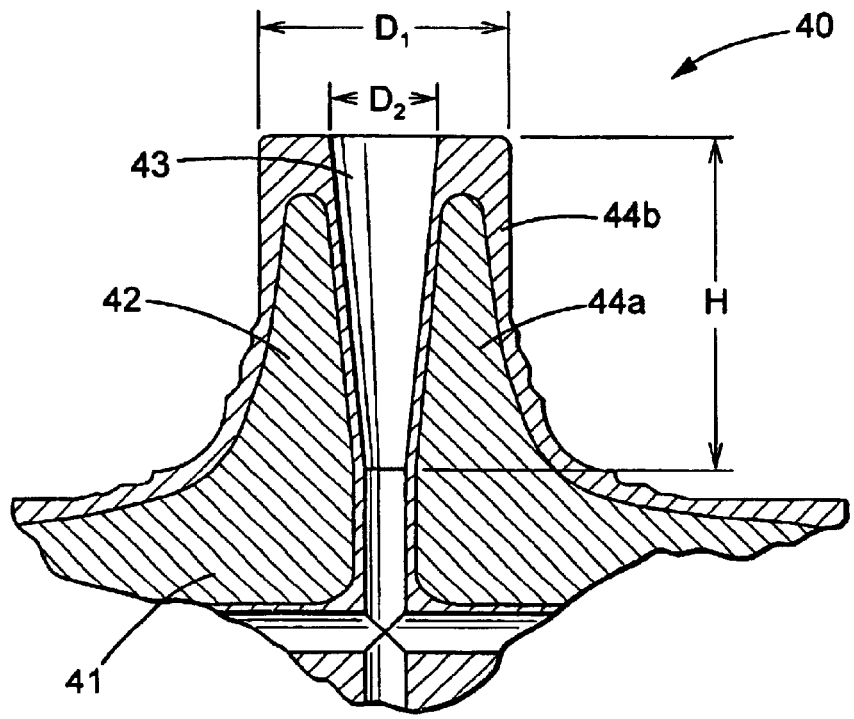
FIG. 4 is an enlarged sectional elevational view similar to FIG. 3 of a portion of a second embodiment of a structure for the journal cross for use in one of the universal joints illustrated in FIG. 1.

FIG. 4 is an enlarged sectional elevational view of a portion of a second embodiment of a structure for a journal cross, indicated generally at 40, in accordance with this invention. The modified journal cross 40 includes a central body portion 41 having a plurality of trunnions 42 extending outwardly therefrom. An internal passageway 43 is formed in each of the trunnions 42, extending outwardly from a central cavity formed in the central body portion 41 of the journal cross 40 through to the outer end surface thereof. The illustrated lubricant passageway 43 is tapered from a relatively small diameter adjacent to the central cavity to a relatively large diameter located at the outer end surface thereof. The journal cross 40 has been subjected to a case hardening heat treatment process so as to have a relatively soft interior portion or core 44a and a relatively hard exterior portion or case 44b on the outer surfaces of each of the trunnions 42.

In this instance, the outer diameter defined by the trunnion 42 is designated as $D_1$ and the relatively large inner diameter defined by the lubricant passageway 43 adjacent to the outer end surface thereof is designated as $D_2$. The same equation used above can be employed to determine relatively large inner diameter defined by the lubricant passageway 43 adjacent to the outer end surface.

Figure 5:
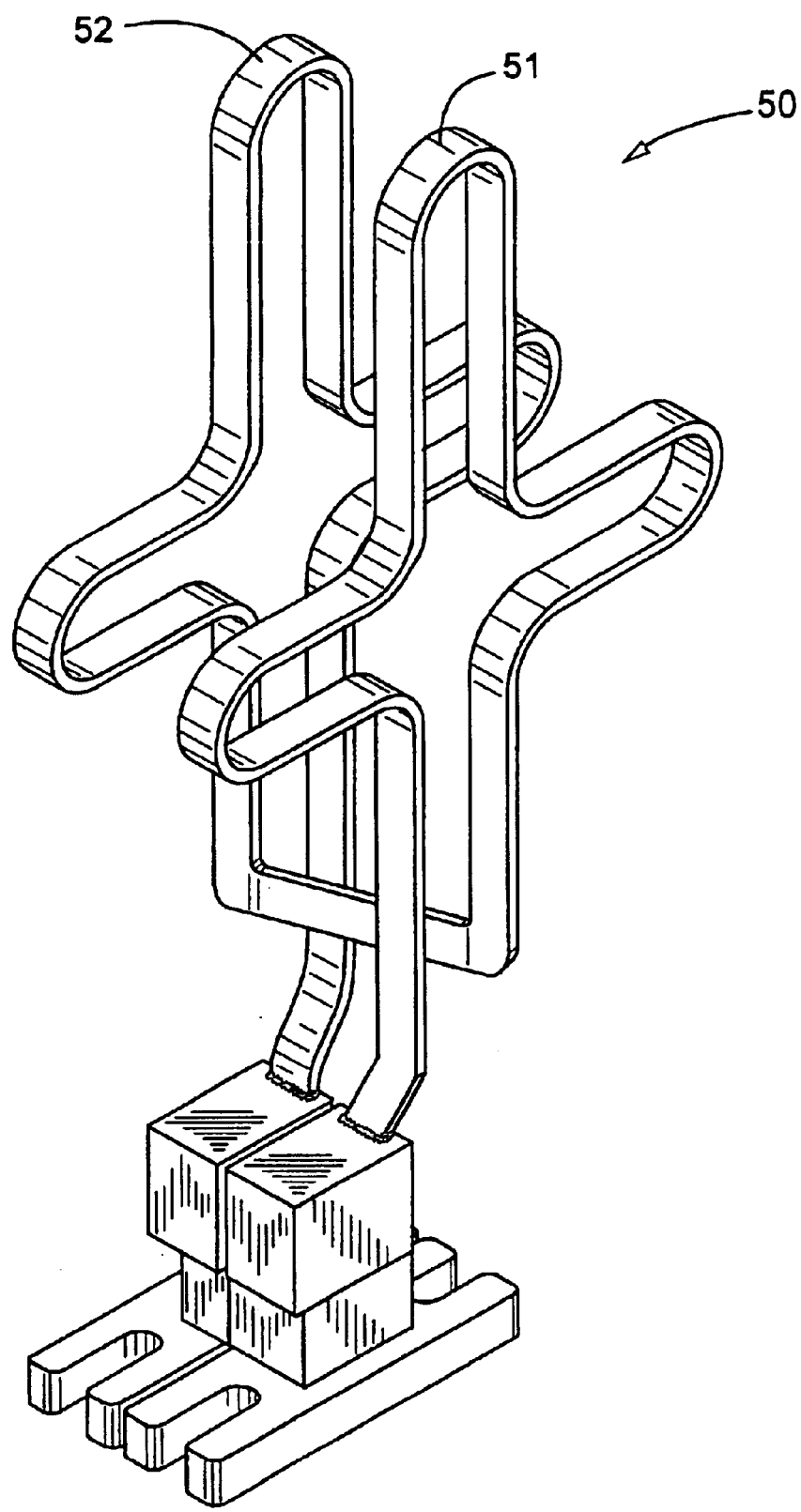
FIG. 5 is a perspective view of an inductor that can be used to case harden the journal crosses illustrated in FIGS. 3 and 4 in accordance with the method of this invention.

FIG. 5 is an enlarged perspective view of an inductor, indicated generally at 50, that can be used to case harden the journal crosses 30 and 40 respectively illustrated in FIGS. 3 and 4 in accordance with the method of this invention. Although any known inductor structure can be used, the illustrated inductor 50 has been found to exhibit desirable results. The inductor 50 is a single electrical conductor that is shaped having two loops 51 and 52. Each of the loops 51 and 52 generally follows the outer shape of the journal cross 30 or 40. The loops 51 and 52 are spaced apart from one another to allow one of the journal crosses 30 or 40 to be disposed therebetween and precisely positioned relative thereto. The ends of the inductor 50 can be connected to a source of electrical power (not shown). When the electrical current is passed through the inductor 50, corresponding electrical currents are induced to flow within the metallic journal cross 30 or 40. Because of the internal electrical resistance of the metallic journal cross 30 or 40 to the flow of electrical current, these induced electrical currents are converted to heat energy. As a result, the portions of the journal cross 30 or 40 adjacent the inductor 50 are rapidly heated to an elevated temperature.

The journal cross 30 or 40 is preferably formed from a medium carbon steel, such as 1055 alloy steel containing a medium amount of manganese (from about 0.6% to about 0.8%, for example). As a result, the journal cross 30 or 40 has a relatively high measure of hardenability ($D_i$ factor of about 1.4, for example).

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope.

What is claimed is:

1. A method for manufacturing a journal cross for use in a universal joint comprising the steps of:
   (a) providing a journal cross including a body having a plurality of trunnions extending outwardly therefrom;
   (b) determining a maximum stress distribution for a particular application for the journal cross;
   (c) calculating a depth of a relatively hard case throughout each of the trunnions based upon the calculated stress distribution; and
   (d) performing a heat treatment process on the journal cross to achieve the desired depth for the relatively hard case throughout each of the trunnions.

2. The method defined in claim 1 wherein said step (b) is performed by computer modeling.

3. The method defined in claim 1 wherein said step (b) is performed by determining the sum of the contact pressures applied to the journal cross during use and the maximum principal stresses resulting from torque applied to the trunnions.

4. The method defined in claim 1 wherein said step (c) is performed by calculating the depth of the relatively hard case to proportionally follow the maximum stress distribution throughout the journal cross.

5. The method defined in claim 1 wherein said step (d) is performed by an inductor.

6. The method defined in claim 1 wherein said step (d) is performed by providing an inductor that is formed from a single electrical conductor that is shaped having two loops that are spaced apart from one another, and by disposing the journal cross between the two loops.

7. The method defined in claim 1 wherein said step (d) is performed by providing an inductor that is formed from a single electrical conductor that is shaped having two loops that each generally follow the outer shape of the journal cross, and by disposing the journal cross between the two loops.

8. The method defined in claim 1 wherein said step (a) is performed by forming a passageway through each of the trunnions, wherein the passageways having a predetermined size in relationship to the overall size of the trunnions.

9. The method defined in claim 8 wherein said step (b) is performed by computer modeling.

10. The method defined in claim 8 wherein said step (b) is performed by determining the sum of the contact pressures applied to the journal cross during use and the maximum principal stresses resulting from torque applied to the trunnions.

11. The method defined in claim 8 wherein said step (c) is performed by calculating the depth of the relatively hard case to proportionally follow the maximum stress distribution throughout the journal cross.

12. The method defined in claim 8 wherein said step (c) is performed by calculating the depth of the relatively hard case to be greater than or equal to one-fourth of the outer diameter of the trunnions less the inner diameter of the lubrication passageways formed through the trunnions.

13. The method defined in claim 8 wherein said step (d) is performed by an inductor.

14. The method defined in claim 8 wherein said step (d) is performed by providing an inductor that is formed from a single electrical conductor that is shaped having two loops that are spaced apart from one another, and by disposing the journal cross between the two loops.

15. The method defined in claim 8 wherein said step (d) is performed by providing an inductor that is formed from a single electrical conductor that is shaped having two loops that each generally follow the outer shape of the journal cross, and by disposing the journal cross between the two loops.

16. A method for manufacturing a journal cross for use in a universal joint comprising the steps of:
   (a) providing a journal cross including a body having a plurality of trunnions extending outwardly therefrom;
   (b) determining a maximum stress distribution for a particular application for the journal cross;
   (c) calculating a depth of a relatively hard case throughout each of the trunnions based upon the calculated stress distribution; and
   (d) performing a heat treatment process on the journal cross to achieve the desired depth for the relatively hard case throughout each of the trunnions by providing an inductor that is formed from a single electrical conductor that is shaped having two loops that are spaced apart from one another, and by disposing the journal cross between the two loops.

17. The method defined in claim 16 wherein said step (b) is performed by computer modeling.

18. The method defined in claim 16 wherein said step (b) is performed by determining the sum of the contact pressures applied to the journal cross during use and the maximum principal stresses resulting from torque applied to the trunnions.

19. The method defined in claim 16 wherein said step (c) is performed by calculating the depth of the relatively hard case to proportionally follow the maximum stress distribution throughout the journal cross.

20. The method defined in claim 16 wherein said step (d) is performed by providing an inductor that is formed from a single electrical conductor that is shaped having two loops that each generally follow the outer shape of the journal cross, and by disposing the journal cross between the two loops.

21. The method defined in claim 16 wherein said step (a) is performed by forming a passageway through each of the trunnions, wherein the passageways having a predetermined size in relationship to the overall size of the trunnions.

22. The method defined in claim 21 wherein said step (b) is performed by computer modeling.

23. The method defined in claim 21 wherein said step (b) is performed by determining the sum of the contact pressures applied to the journal cross during use and the maximum principal stresses resulting from torque applied to the trunnions.

24. The method defined in claim 21 wherein said step (c) is performed by calculating the depth of the relatively hard case to proportionally follow the maximum stress distribution throughout the journal cross.

25. The method defined in claim 21 wherein said step (c) is performed by calculating the depth of the relatively hard case to be greater than or equal to one-fourth of the outer diameter of the trunnions less the inner diameter of the lubrication passageways formed through the trunnions.

26. A method for manufacturing a journal cross for use in a universal joint comprising the steps of:
   (a) providing a journal cross including a body having a plurality of trunnions extending outwardly therefrom;
   (b) determining a maximum stress distribution for a particular application for the journal cross;
   (c) calculating a depth of a relatively hard case throughout each of the trunnions based upon the calculated stress distribution; and (d) performing a heat treatment process on the journal cross to achieve the desired depth for the relatively hard case throughout each of the trunnions by providing an inductor that is formed from a single electrical conductor that is shaped having two loops that each generally follow the outer shape of the journal cross, and by disposing the journal cross between the two loops.

27. The method defined in claim 26 wherein said step (b) is performed by computer modeling.

28. The method defined in claim 26 wherein said step (b) is performed by determining the sum of the contact pressures applied to the journal cross during use and the maximum principal stresses resulting from torque applied to the trunnions.

29. The method defined in claim 26 wherein said step (c) is performed by calculating the depth of the relatively hard case to proportionally follow the maximum stress distribution throughout the journal cross.

30. The method defined in claim 26 wherein said step (d) is performed by providing an inductor that is formed from a single electrical conductor that is shaped having two loops that are spaced apart from one another, and by disposing the journal cross between the two loops.

31. The method defined in claim 26 wherein said step (a) is performed by forming a passageway through each of the trunnions, wherein the passageways having a predetermined size in relationship to the overall size of the trunnions.

32. The method defined in claim 31 wherein said step (b) is performed by computer modeling.

33. The method defined in claim 31 wherein said step (b) is performed by determining the sum of the contact pressures applied to the journal cross during use and the maximum principal stresses resulting from torque applied to the trunnions.

34. The method defined in claim 31 wherein said step (c) is performed by calculating the depth of the relatively hard case to proportionally follow the maximum stress distribution throughout the journal cross.

35. The method defined in claim 31 wherein said step (c) is performed by calculating the depth of the relatively hard case to be greater than or equal to one-fourth of the outer diameter of the trunnions less the inner diameter of the lubrication passageways formed through the trunnions.

36. A method for manufacturing a journal cross for use in a universal joint comprising the steps of:
(a) providing a journal cross including a body having a plurality of trunnions extending outwardly therefrom, wherein a passageway is formed through each of the trunnions, the passageways having a predetermined size in relationship to the overall size of the trunnions;
(b) determining a maximum stress distribution for a particular application for the journal cross;
(c) calculating a depth of a relatively hard case throughout each of the trunnions to be greater than or equal to one-fourth of the outer diameter of the trunnions less the inner diameter of the lubrication passageways formed through the trunnions; and
(d) performing a heat treatment process on the journal cross to achieve the desired depth for the relatively hard case throughout each of the trunnions.

37. The method defined in claim 36 wherein said step (b) is performed by computer modeling.

38. The method defined in claim 36 wherein said step (b) is performed by determining the sum of the contact pressures applied to the journal cross during use and the maximum principal stresses resulting from torque applied to the trunnions.

39. The method defined in claim 36 wherein said step (d) is performed by an inductor.

40. The method defined in claim 36 wherein said step (d) is performed by providing an inductor that is formed from a single electrical conductor that is shaped having two loops that are spaced apart from one another, and by disposing the journal cross between the two loops.

41. The method defined in claim 36 wherein said step (d) is performed by providing an inductor that is formed from a single electrical conductor that is shaped having two loops that each generally follow the outer shape of the journal cross, and by disposing the journal cross between the two loops.

* * * * *